United States Patent [19]

Heeks

[11] Patent Number: 4,663,596
[45] Date of Patent: May 5, 1987

[54] OPTICAL TRANSMISSION SYSTEM
[75] Inventor: John S. Heeks, Harlow, England
[73] Assignee: Standard Telephones and Cables Public Limited Company, London, England
[21] Appl. No.: 729,250
[22] Filed: May 1, 1985
[30] Foreign Application Priority Data Jun. 14, 1984 [GB] United Kingdom ............... 8415212

[51] Int. Cl.⁴ .......................... H04B 9/00; G02B 5/14
[52] U.S. Cl. .................................... 330/4.3; 332/7.51; 455/601
[58] Field of Search .......................... 330/4.3, 4.9, 59; 332/7.51; 455/601

[56] References Cited

U.S. PATENT DOCUMENTS

| 3,488,586 | 1/1970 | Watrous et al. | 455/601 |
| 3,747,004 | 7/1973 | Sasnett | 332/7.51 |
| 4,002,896 | 1/1977 | Davies et al. | 332/7.51 |
| 4,019,048 | 4/1977 | Maione et al. | 455/601 |
| 4,075,474 | 2/1978 | Straus et al. | 332/7.51 |
| 4,295,225 | 10/1981 | Par | 455/601 |
| 4,499,600 | 2/1985 | Powell et al. | 455/601 |

FOREIGN PATENT DOCUMENTS 2113035 7/1983 United Kingdom ............... 455/601
2160380 12/1985 United Kingdom ............... 455/601

OTHER PUBLICATIONS

Davies et al, "Optoelectronic Regenerative Pulses", 2/28/80, pp. 166-167, Elect. Lett., vol. 16, #5.

Primary Examiner—Nelson Moskowitz
Attorney, Agent, or Firm—Kerkam, Stowell, Kondracki & Clarke

[57] ABSTRACT

In a coherent optical transmission system an input optical signal is amplified by being frequency down converted to an intermediate frequency, for example by means of a photodiode (1) and a reference optical local oscillator signal, and the photodiode output current is amplified in a GaAs FET wideband amplifier (6) and inserted on an optical carrier signal comprised by the reference signal by means, for example, of an integrated optical single sideband modulator (up converter) (7). By use of the same optical local oscillator to drive both the photodiode down converter and the integrated optic single sideband up converter, input/output coherence is ensured. The optical local oscillator may be comprised by a GaAlAs laser (3) stabilized to an "atomic" standard (4,5). Channel dropping/insertion may be carried out at the intermediate frequency, for example following the amplifier (6).

9 Claims, 4 Drawing Figures $\Delta f\ (FET) - \Delta f\ (INFORMATION) = \sim 100\ MHz$ Cs – D₂ LINE STABILISATION AT 0.85μm

ABSORPTION SPECTRA

CELL SIZE 5 x 3 cm
PRESSURE 4 x 10⁻⁷ Torr.
SHORT TERM STABILITY ~ 10 kHz

OPTICAL TRANSMISSION SYSTEM

BACKGROUND OF THE INVENTION

This invention relates to optical amplifiers and in particular to coherent optical transmission systems.

SUMMARY OF THE INVENTION

According to one aspect of the present invention there is provided an optical signal amplifier comprising means for deriving a reference optical signal, means for converting an input optical signal to an electrical signal at an electrical frequency intermediate the optical frequencies of said reference and input optical signals, means for amplifying the electrical signal, and means for inserting the amplified electrical signal onto an optical carrier comprised by said reference optical signal whereby to provide an output optical signal coherent with said input optical signal and amplified with respect thereto.

According to another aspect of the present invention there is provided a coherent optical transmission system including an optical signal amplifier comprising means for deriving a reference optical signal, means for converting an input optical signal to an electrical signal at an electrical frequency intermediate the optical frequencies of said reference and input optical signals, means for amplifying the electrical signal, and means for inserting the amplified electrical signal onto an optical carrier comprised by said reference optical signal whereby to obtain an output optical signal coherent with said input optical signal and amplified with respect thereto.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1A:
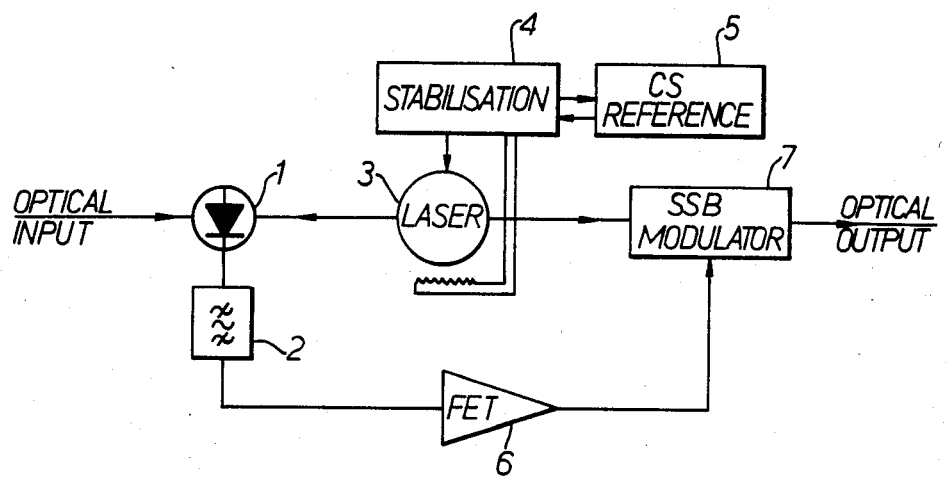
FIG. 1a illustrates a circuit diagram of a linear optical IF (intermediate frequency) amplifier.

The main advantages which accrue from the adoption of coherent methods in high capacity, long haul optical fibre systems include increased repeater spacing by improvement of the detection sensitivity to the quantum limit; the adoption of frequency domain multiplexing to increase the capacity of the system, that is the contiguous addition of channels of time division multiplexed information, each operating at the maximum bit rate as determined by the fibre dispersion or the speed of the associated electronic circuitry; increased options for modulation format, for example high quality analogue based on wide deviation (in optical carrier) FM (frequency modulation); an easing in the linearity requirements of the associated post-photodetection amplification, which in coherent detection is linear rather than second order, that is for 60 dB system dynamic range the amplifier needs only 60 dB not 120 dB range; and the possibility of realising optical amplification in a "black box" format.

It is with the latter advantage with which the present invention is basically concerned. The optical amplification is achieved via frequency conversion and amplification at an IF (intermediate frequency). This in turn makes for convenient channel dropping and channel access at the IF.

In general, the functions provided by a regeneration/branching point of a transmission system are signal amplification, channel dropping, channel insertion and retiming. These functions can be implemented in an optical system, such as a fibre optic link, by the circuit of FIG. 1a which comprises a photodiode 1, a bandpass filter 2, a laser 3, for example of GaAlAs, a stabilisation circuit 4 with an "atomic" standard 5, a GaAs FET, for example, wideband amplifier 6 and a single sideband modulator 7. The circuit of FIG. 1a has an optical input and an optical output and comprises a linear optical (IF) amplifier.

Figure 3:
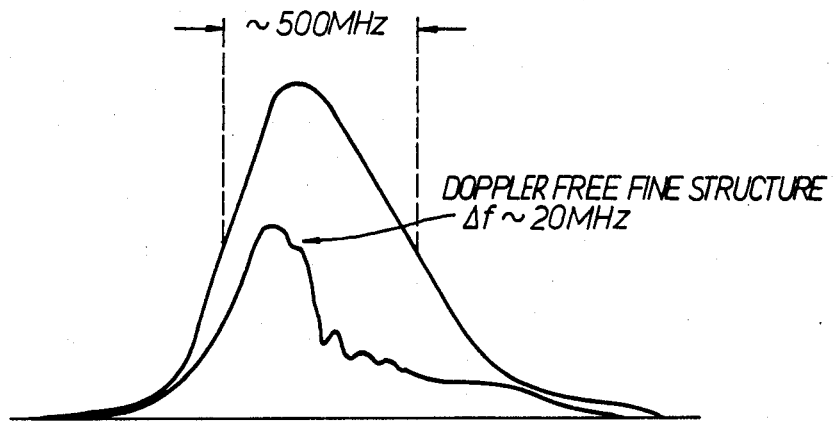
FIG. 3 illustrates the absorption spectra of the $D_2$ line of cesium at 0.85 μm.

The laser 3 together with stabilisation circuit 4 and "atomic" standard 5 comprise an optical local oscillator stabilised to an "atomic" standard in order to retain a high coherence and to keep the IF within the electronic bandwidth of the regenerator. At 0.85 μm such a standard has been reported in the literature ("Frequency stabilisation of GaAlAs laser using a Doppler-free spectrum of the Cs-$D_2$ line", IEEE J. Quantum Electronics, Vol. 19, No. 2, pp 169-175, February 1983) based on the $D_2$ line of Cesium and with an absolute resolution better than 10 MHz (see FIG. 3). Alternative standards exist throughout the contemplated wavelength range of optical transmission systems and thus restriction to 0.85 μm is not necessary.

The photodiode 1 and the optical local oscillator together comprise a frequency down converter. The photodiode 1 is illuminated by the input optical signal and the optical local oscillator signal which is of substantially higher power, typically a few milliwatts The photodiode output current, at the optical difference frequency (intermediate frequency), is amplified in the GaAs wideband amplifier 6 following bandpass filtering by filter 2. In a high information capacity optical system the amplifier 6 might have a bandwidth of 10 GHz centred on 15 GHz. FIG. 1b illustrates the flat linear nature, over a wide frequency range, of the amplification versus frequency response of the amplifier 6, and the portion thereof associated with the information carried by the input optical signal.

Figure 1B:
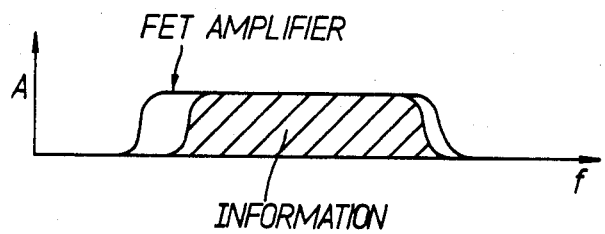
FIG. 1b illustrates the amplification versus frequency characteristics for an FET amplifier and the incoming information.

The output of amplifier 6 may be processed at the intermediate frequency before reinsertion on an optical carrier signal, although FIG. 1a merely shows an optical amplifier without such processing. Preferably the information modulator format would comprise FDM channels with TDM within a given channel. Channel dropping from, or channel insertion on, the amplifier 6 output before reinsertion on the optical carrier may be accomplished at the IF by conventional microwave filter techniques, realised in, for example, microstrip technology. If retiming is necessary it may be performed at the individual frequency channel level in the conventional manner.

The amplified, and if appropriate processed, FDM block is inserted on the optical carrier signal via a single sideband modulation (up conversion) process, the optical carrier signal being comprised of a portion of the same output of the optical local oscillator which was used for the down conversion, hence ensuring identical input and output optical frequencies. This reinsertion by single sideband modulation may be accomplished by, for example, an integrated optic (electro-optic) single sideband up converter device as illustrated schematically in FIG. 2.

Figure 2:
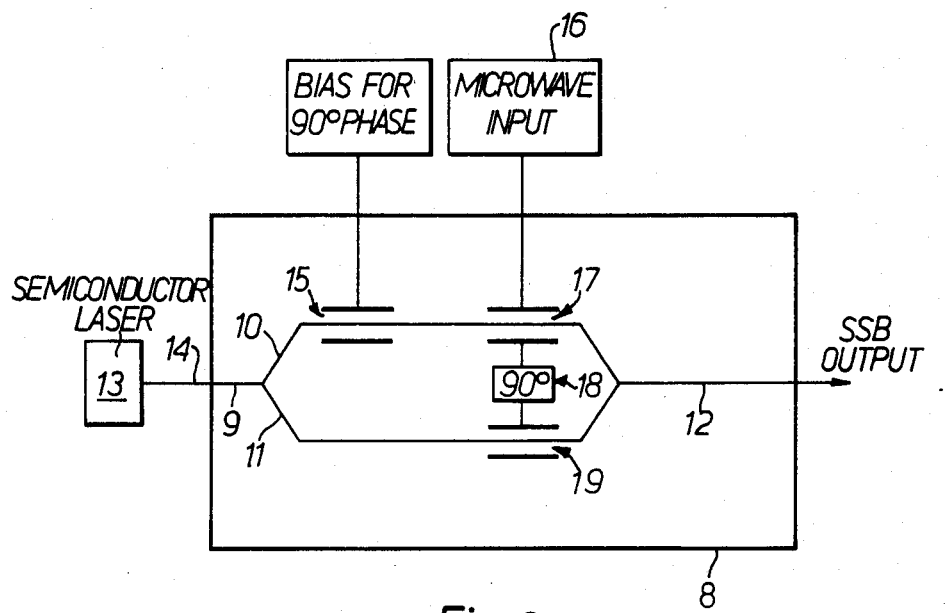
FIG. 2 illustrates an integrated optic single sideband modulator.

The integrated optic device of FIG. 2 comprises a lithium niobate substrate 8 in which are diffused an input waveguide 9, two branch waveguides 10 and 11 of substantially identical optical length, and an output waveguide 12. The optical signal output from a semiconductor laser 13 is applied to the input waveguide 9 directly or via an optical fibre 14. In use with the circuit of FIG. 1a the laser 13 would be comprised by the laser 6. The optical signal from laser 13 is divided into two portions each being directed along a respective one of the branch waveguides 10 and 11. In branch 10 the phase of the optical signal therein is changed by 90° relative to that in the other branch 11 as a result of the application of a suitable electrical field (d.c. bias) via metallic electrodes 15 disposed on the substrate adjacent to a portion of waveguide branch 10. A signal, shown as a microwave input 16, to be inserted onto the optical carrier signal, that is the optical output of laser 13, is then applied to the optical signal in waveguide branch 10 via metallic electrodes 17 and is also applied in quadrature, via a 90° phase shifter 18, to the optical signal in waveguide branch 11 via metallic electrodes 19, The optical signals at the outlet ends of waveguide branches 10 and are of different phases and produce consequent destructive optical interference at the carrier and unwanted sideband frequencies at the convergence of the waveguide branches 10 and 11 into the output waveguide 12.

A refinement of the circuit of FIG. 2, particularly for when employed in the optical amplifier of FIG. 1a, involves the introduction of an optical delay, of magnitude equal to the delay in the electronic path, between the optical local oscillator and the single sideband modulator in order to cancel all but the highest frequency noise components introduced by the optical local oscillator.

Instead of employing an optical local oscillator comprised of a laser stabilised to an atomic standard as described above, the circuit could be operated in a swept local oscillator mode, locking into a particular frequency channel with a characteristic signature, such as by adjusting the current in the laser in response to an automatic frequency control arrangement.

The specific arrangements described above are such as to achieve linear optical amplification for a coherent optical transmission system by means of a number of sophisticated "circuit" elements which have no correspondence at lower frequencies. These elements have already been demonstrated, in principle at least.

I claim:
1. An optical signal amplifier comprising means for deriving a reference optical signal, means for converting an input optical signal to an electrical signal at an electrical frequency intermediate the optical frequencies of said reference and input optical signals, means for amplifying the electrical signal, and means for inserting the amplified electrical signal onto an optical carrier comprised by said reference optical signal whereby to provide an output optical signal coherent with said input optical signal and amplified with respect thereto.

2. An amplifier as claimed in claim 1, wherein said conversion means comprises a frequency down converter.

3. An amplifier as claimed in claim 2, wherein said frequency down converter is comprised of a photodiode and wherein said reference optical signal deriving means is comprised by an optical local oscillator stabilised to an "atomic" standard, the photodiode being illuminated by the input optical signal and said reference optical signal and having an output current at the intermediate frequency which is comprised by the optical difference frequency between the input and the reference optical frequencies.

4. An amplifier as claimed in claim 2, wherein said frequency down converter is comprised by a photodiode, and wherein said reference optical signal deriving means is comprised by a laser operated in a swept local oscillator search mode and locking into a predetermined optical frequency channel, the photodiode being illuminated by the input optical signal and said reference optical signal and having an output current at the intermediate frequency which is comprised by the optical difference frequency between the input optical frequency and the predetermined optical frequency.

5. An amplifier as claimed in claim 1, wherein the insertion means comprises an integrated optic single sideband up converter whose input optical signal comprises the reference optical signal.

6. An amplifier as claimed in claim 1, wherein said amplifying means comprises a GaAs wideband amplifier.

7. A coherent optical transmission system including an optical signal amplifier comprising means for deriving a reference optical signal, means for converting an input optical signal to an electrical signal at an electrical frequency intermediate the optical frequencies of said reference and input optical signals, means for amplifying the electrical signal, and means for inserting the amplified electrical signal onto an optical carrier comprised by said reference optical signal whereby to obtain an output optical signal coherent with said input optical signal and amplified with respect thereto.

8. A coherent optical transmission system as claimed in claim 7 and including means for channel dropping from and channel insertion on the electrical signal at the intermediate frequency.

9. A coherent optical transmission system as claimed in claim 7 and including means for retiming the electrical signal at the intermediate frequency.

* * * * *